United States Patent [19]

Freeman et al.

[11] Patent Number: 4,558,447
[45] Date of Patent: Dec. 10, 1985

[54] SELF-TESTING FACILITIES OF OFF-CHIP DRIVERS FOR PROCESSOR AND THE LIKE

[75] Inventors: Joseph W. Freeman; Wayne R. Kraft, both of Coral Springs; Hobart L. Kurtz, Boca Raton; Israel B. Magrisso, Coral Springs, all of Fla.

[73] Assignee: International Business Machines Corporation, Armonk, N.Y.

[21] Appl. No.: 470,033

[22] Filed: Feb. 28, 1983

[51] Int. Cl.[4] .............................................. G06F 11/00
[52] U.S. Cl. ..................................... 371/71; 324/73 R
[58] Field of Search ......................... 371/24, 71, 2, 55; 324/73 R; 365/200, 201

[56] References Cited

U.S. PATENT DOCUMENTS

| | | | |
|---|---|---|---|
| 3,008,129 | 11/1961 | Katz | 371/71 X |
| 3,049,692 | 8/1962 | Hunt | 371/71 |
| 3,439,343 | 4/1969 | Stahle | 371/24 X |
| 3,794,818 | 2/1974 | Kennedy | 371/71 |
| 4,159,534 | 6/1979 | Getson, Jr. et al. | 371/71 X |

OTHER PUBLICATIONS

Sellers, Memory Write Error Detection, IBM Tech. Disclosure Bulletin, vol. 9, No. 6, Nov. 1966, p. 669.
Conroy, Organizational Checker, IBM Tech. Disc. Bulletin, vol. 4, No. 6, Nov. 1961, p. 16.
Pomerene, Register Transfer Check, IBM Tech. Disc. Bull., vol. 1, No. 4, Dec. 1958, p. 18.

*Primary Examiner*—Jerry Smith
*Assistant Examiner*—Mark Ungerman
*Attorney, Agent, or Firm*—D. Kendall Cooper

[57] ABSTRACT

Self-test techniques for checking driver circuits connected to a bus are described that particularly involve the detection and isolation of failures in off-chip-drivers and connections.

9 Claims, 4 Drawing Figures

FIG. I

SELF-TESTING FACILITIES OF OFF-CHIP DRIVERS FOR PROCESSOR AND THE LIKE

BACKGROUND OF THE INVENTION

This invention relates to self-testing facilities for processor systems and the like and more particularly to a more efficient arrangement for self-testing of off-chip driver circuits having improved serviceability, reliability and that is easier to manufacture.

Testing systems of a useful nature have been described heretofore wherein processor elements have been checked, for example, for proper operation of registers and circuit chips.

The following patents are representative of the prior art.

U.S. Pat. No. 3,523,279 discloses a technique for checking register contents to verify the operability of both the registers and the bus which connects them.

U.S. Pat. No. 3,633,016 describes a testing technique which employs an I/O compare in conjunction with the application of a test signal.

U.S. Pat. No. 4,176,258 discloses the use of on-chip check circuits for testing purposes.

U.S. Pat. No. 4,159,534 describes a register and bus checking scheme in which a comparison is made between the contents of the input and output registers.

U.S. Pat. Nos. 4,236,246; 4,266,293; 4,163,210 and 4,178,582 all disclose other testing techniques of incidental interest.

The primary objective of the present invention is to accomplish self-testing of circuit chips and a system bus structure.

SUMMARY OF THE INVENTION

In accordance with the present invention, a multi-drop mult-leaved bus with self-test technique is described which detects and isolates failures in off-chip drivers and connections. This technique involves drivers connected to a common bus and additional logic for comparing the outputs and/or internal states of the individual drivers with their inputs. The technique is especially useful in connection with VLSI (Very Large Scale Integration) technology. Such technology is described, for example, in the U.S. Pat. No. 3,783,254 having Edward B. Eichelberger, as inventor and entitled "Level Sensitive Logic System".

In the practice of the present invention, tests of off-chip bus drivers are made as well as the interconnecting bus structure. Any failing component is detected. It may then be isolated before it causes defects to occur in other components.

In the preferred embodiments described, logic is added to compare the state of selected output or status signals with signals representative of the input states of the drivers. Miscompares that occur at any of the drivers' test logic during a specified sample time are stored as an error in a latch. This latch indicates that a failure has been detected.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings.

Abbreviations

The following abbreviations are occasionally used herein:

| Abbreviation | Definition |
| --- | --- |
| A | And circuit |
| C | Clock B |
| CFET | Complementary Field Effect Transistor |
| D | Driver output |
| DR_ | Driver block |
| E, $\overline{E}$ | Error, Not Error |
| EX OR | Exclusive Or (Also $\forall$) |
| G | Output is Good |
| I | Data Input Status |
| R | Reset, function dependent on architecture definition such as, Device, System, or Power On Resets |
| S | Current Sense Output |
| V Ref | Reference Voltage |
| VLSI | Very Large Scale Integration |

DETAILED DESCRIPTION

The off-chip drivers and connections in a data processing system are the areas that are most prone to have high failure rate of the components. Detection and isolation of these failures increases serviceability, reliability and manufacturability of the system.

A driver input/internal state and/or output compare technique, is used that at least with respect to a first category of driver, validates a bus inactive state. Each component is allowed to check that there are no active minus signals interfering with their bus operation. Therefore it validates a 'bus clear' condition.

Figure 1:
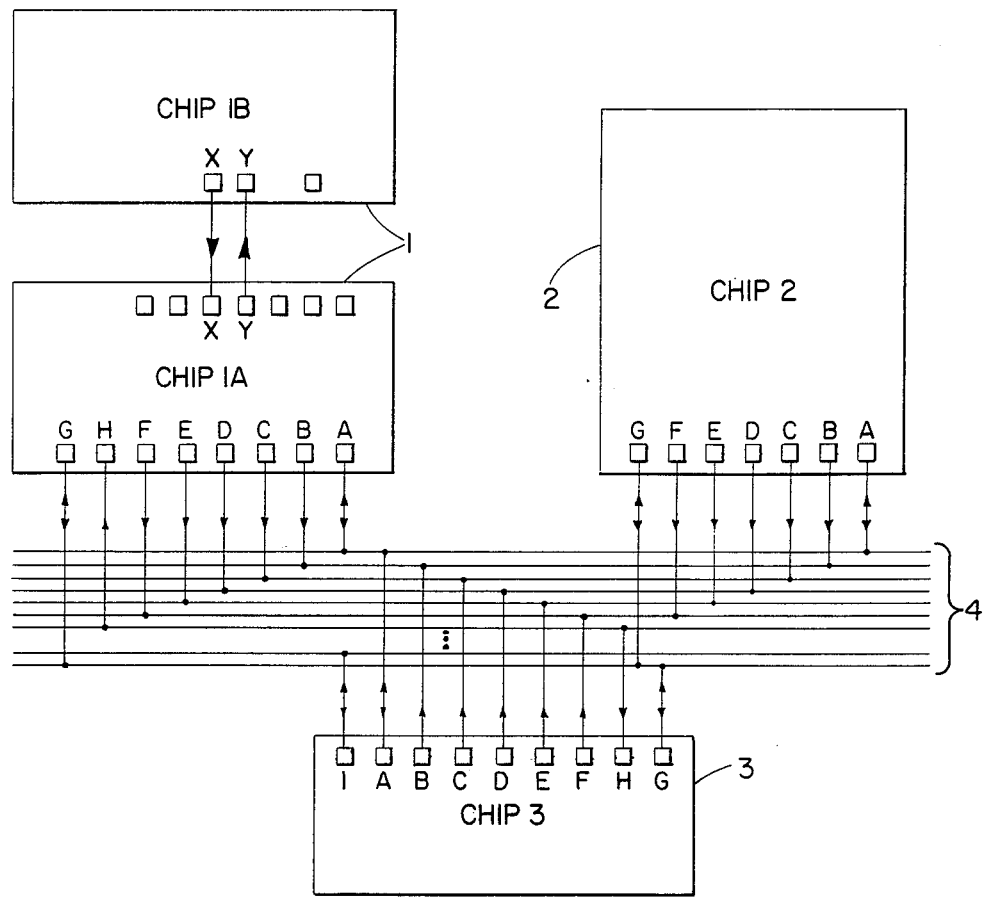
FIG. 1 is a processor system diagram with self-test facilities showing a number of circuit chips and an interconnecting bus structure.

The approach utilizes test logic added to each off-chip driver that connects to a bus as shown in FIG. 1. This technique can also be applied to any component off-chip driver whether it is connected to a system bus or used for interconnection between components.

FIG. 1 shows a processor system having circuit chips 1–3 interconnected by way of a common bus structure 4. Other devices may be connected to bus structure 4.

The functions of the chips shown in FIG. 1 are dependent on the requirements of the system. In a representative system, chip 1A could be an Instruction Processor while chip 1B could be a Microcode Store, a Private Store, a Floating Point Processor, etc. Chips 2 and 3 could be any type of Input/Output attachment facility such as a channel, a device controller or an Input/Output subsystem. They could also contain Main Memory, Timers, etc.

Typically during operation of the system of FIG. 1, multiple Input/Output facilities are provided that, in conjunction with a processor, are multidropped on a common memory bus, the various devices sharing the bus in an arbitrated multi-leaved fashion.

From time to time in the system of FIG. 1 various elements may serve as bus masters for supervising the bus lines for data transfer, control and status functions. Each bus master may include a control tag indicator. At appropriate times in order to detect errors in the system each bus master performs the following:

1. Samples compare circuits in FIGS. 2 or 3 before driving control tag that indicates bus is good. (Select, Service Gate, etc.) i.e. during specified sample time.
2. Samples compare circuits just prior to dropping control tag that indicates bus is clear.
3 If error occurs in either case, error signal line is raised before activating or deactivating control tag.
4. Meaning and use of error signal is bus architecture and implementation dependent. If the error signal goes to a bus arbiter, an interrupt line can be raised to notify a main processor or other processor of the error so steps can be taken to correct the error condition.

Each of the circuit chips 1–3 has off-chip drivers having alphabetic designations. For example, chip 2 has off-chip drivers A–G. As another example, chips 1A and 1B have drivers X,Y for inter-chip driving but not connected via bus 4. Off-chip drivers, in contrast with internal-chip drivers, are designed to handle loads encountered on a bus which are heavier than those usually encountered within a chip. Typical off-chip drivers known in the art are push-pull, three-state and open collector drivers. The drivers (and their driven lines) may be of three types. Types 1 and 2 ordinarily are utilized for 90% of the driving requirements. Type 3 is utilized for the other 10%

Type 1 and 2 drivers can make use of "three-state" circuits wherein current is flowing only during transition but not in a steady state condition after transition. Type 3 drivers make use of open collector circuits wherein current flows when they are active.

The distinctions among the various types are given below:

| Driver Type | |
|---|---|
| 1 | Point to Point, that is, one to one relationship, and no other driver or drivers attached to the same bus line. Examples: Drivers between chips 1A and 1B in FIG. 1. |
| 2 | Multiple drivers attached to a single bus line but not simultaneously driving said single bus line such as address, data and control lines, Read/Write, I/O etc. Examples: Drivers between chips 1A, 2 and 3 in FIG. 1. |
| 3 | Multiple drivers attached to a single bus line where said drivers do drive said single bus line simultaneously such as bus request and interrupt request lines. Not specifically shown in FIG. 1 |

Error Conditions of Type 1 and 2 drivers can be detected with compare logic of input/output. Therefore, these, drivers can be three state drivers as noted above.

The Type 3 driver operates with a driver macro which compares the data logic input to the internal state of the driver (conducting or not) independent of the state of the line.

For Type 2 driver it is assumed that no double errors occur where an individual driver circuit has a bad driver and a bad detection mechanism.

Error Detection—Driver Types 1 and 2

Figure 2:
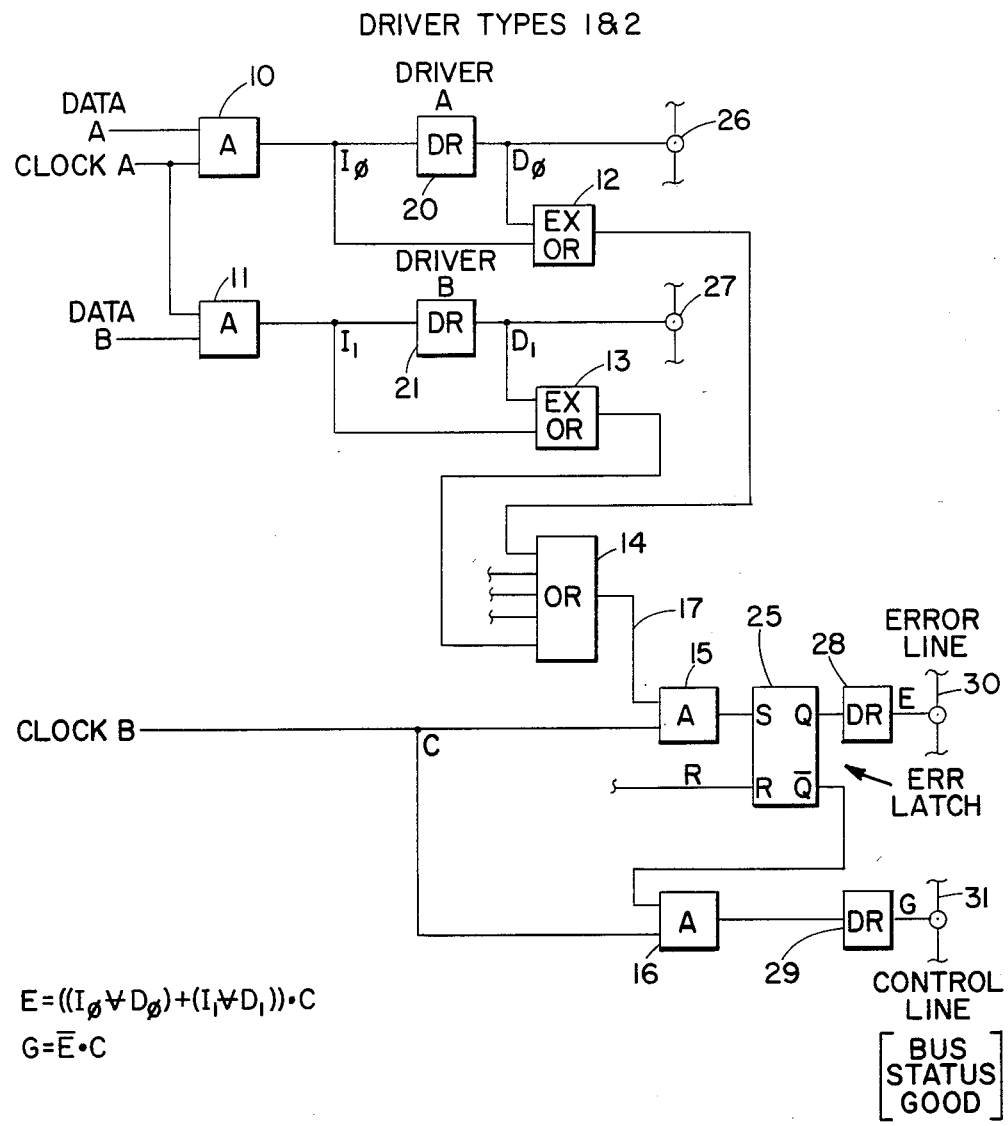
FIG. 2 illustrates several off-chip driver circuits representative of drivers designated Types 1 and 2 and added logic for comparison of signals, detection of signals and indication of errors.

The logic in FIG. 2 is provided for off-chip drivers, Types 1 and 2, and compares the output states of the drivers with the condition of the input gates to the drivers. Miscompares (disparities) that occur at any of the drivers' test logic during a specified test time are stored as an error in a latch. This latch indicates that the component has detected a failure. The action to be taken when the error occurs depends on the function and implementation of the component, and the architecture of the system using this technique.

The circuitry of FIG. 2 includes a number of logic blocks designated 10–16, driver blocks 20 and 21 further designated Driver A and Driver B, respectively, an Error latch circuit 25, driver 28 driving Error line 30 to indicate an error condition and driver 29 driving Control line 31 to indicate a "Good" non-error condition.

The driver blocks 20 and 21 and associated Exclusive Or blocks 12 and 13 can be implemented as macros. The outputs of gates 10 and 11, for example, represent data signals A and B to be presented to bus 4, FIG. 1 and are supplied to drivers 20 and 21 respectively at Clock A time.

As presently constituted, blocks 12 and 13 serve as check circuit logic to read driver input signals applied to driver blocks 20 and 21 and bus signals at terminals 26 and 27. Blocks 12 and 13 are not used for bus lines driven simultaneously by other components, as in the Type 3 driver circuits.

In the event of a miscompare, a signal is provided from one (or both) of the blocks 12 or 13 to Or circuit 14. All Exclusive Or check blocks feed to Or circuit 14. Any input to Or circuit 14 results in an output via line 17 to set latch 25 at Clock B time which is later, but overlapped with Clock A time. Latch 25 in its set state indicates that an error has been detected via driver 28 and line 30. This can be monitored by other circuitry, not shown.

Boolean expressions for Error (E) and Good (G) conditions are included in FIG. 2. These indicate signal level conditions in the circuitry for error and non-error status.

The function of the logic described in FIG. 2 is twofold. First, it detects that the output and input of the drivers compares when a chip is a bus master (it is driving the bus). The failure of this test could indicate a failure of the chip itself or a failure of another element on the bus. This test is not performed to drivers of bus lines which can be driven simultaneously to be described in conjunction with FIGS. 3 and 4. Also the logic of FIG. 3 checks that when the output of the driver is at a plus level, the input is not trying to force it to a minus level. The test just mentioned is performed whether or not the component is a bus master. The two types of miscompares can be differentiated and information provided which will isolate the failure to the driver which detected the miscompare.

Error Detection—Driver Type 3

Figure 3:
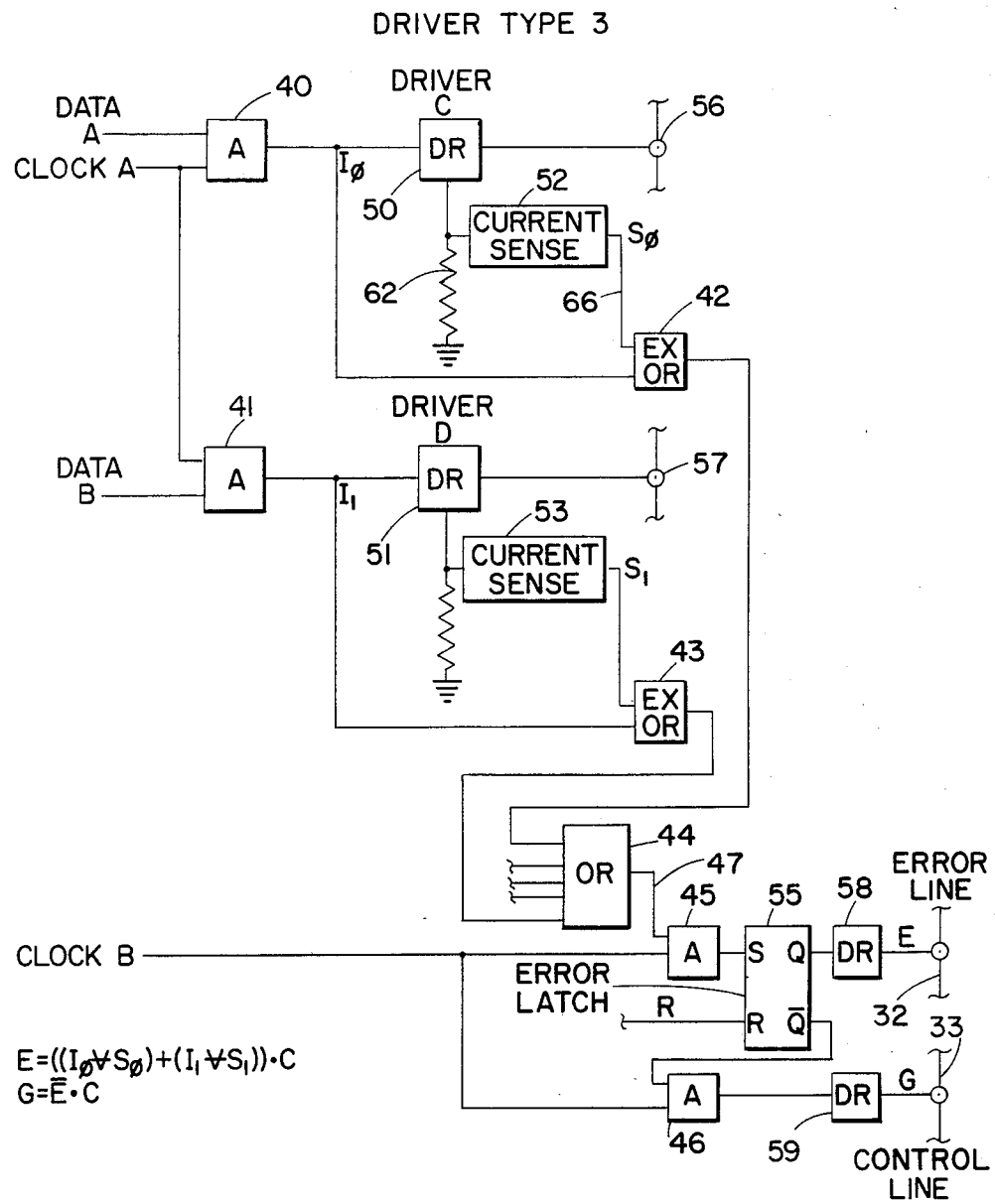
FIG. 3 illustrates circuitry that is comparable to that shown in FIG. 2 except that it is designed for drivers designated Type 3.

Other logic, FIG. 3 (and FIG. 4), is provided for off-chip drivers, Type 3. The internal states of the drivers are compared with the condition of the input gates to the drivers. As with the circuit in FIG. 2, miscompares (disparities) that occur at any of the drivers' test logic during a specified test time are stored as an error in a latch.

In FIG. 3, the circuitry includes a number of logic blocks designated 40-46, driver blocks 50 and 51 further designated Driver C and Driver D, respectively, an Error latch circuit 55, driver 58 driving Error line 32, and driver 59 driving Control line 33 to indicate a Good non-error condition.

Driver blocks 50 and 51 have associated current sense blocks 52 and 53 and Exclusive Or blocks 42 and 43. The outputs of gates 40 and 41, as in FIG. 2 represent data signals A and B to be presented to bus 4, FIG. 1 and are supplied to drivers 50 and 51 at Clock A time.

When a miscompare occurs, a signal is provided to Or circuit 44 from one (or both) of the blocks 42 or 43 as the case may be, as a result of activation of the related current sense circuit 52 or 53. All Exclusive Or check blocks feed to Or circuit 44. Any input to Or circuit 44 results in an output via line 47 to set latch 55 at Clock B time with latch 55 in its set state indicating that an error has been detected.

In FIG. 2, the state of the output line is checked against the input data line while in FIG. 3 the state of the driver is checked against the input data line.

Boolean expressions for Error and Non-Error (Good) conditions are also included in FIG. 3.

Figure 4:
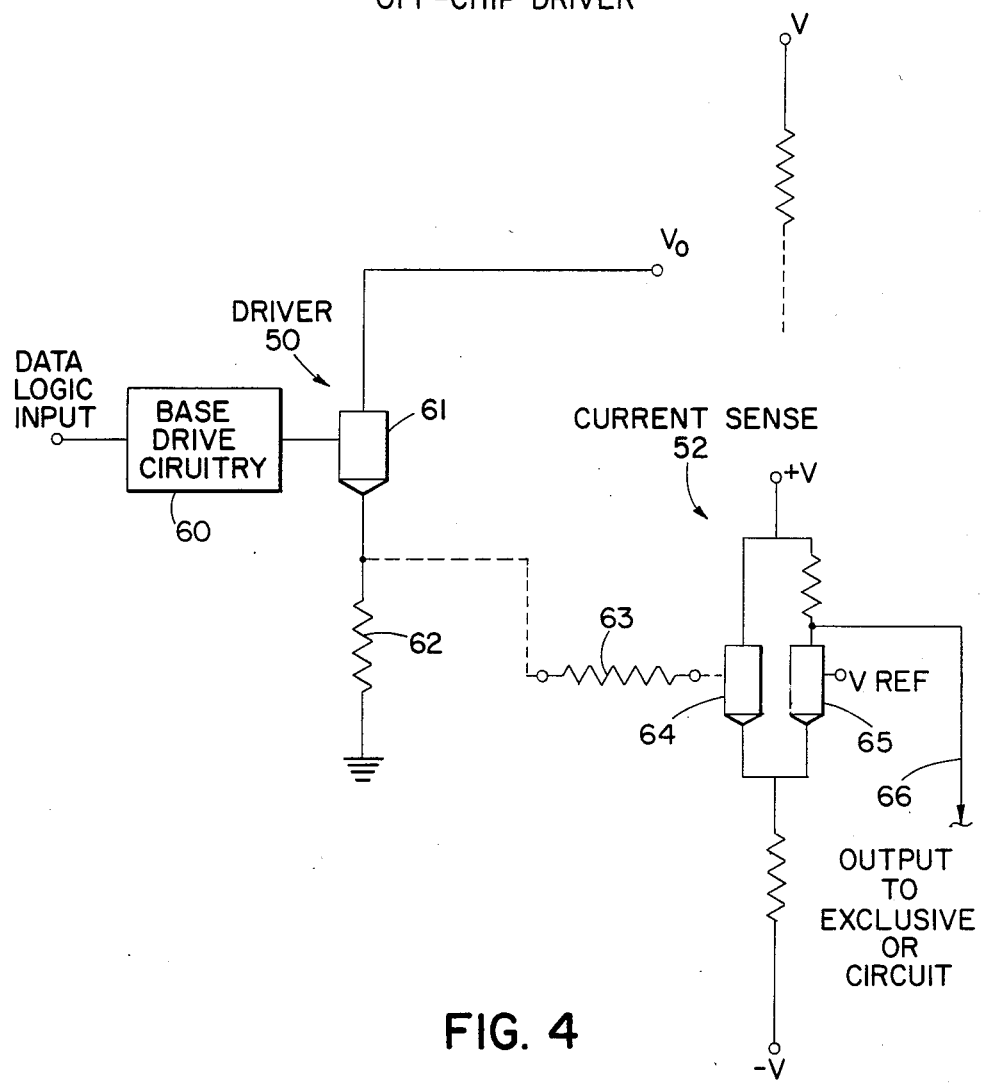
FIG. 4 is a detailed diagram of a circuit for sensing current in an output transistor of an open collector off-chip driver.

Simplified detailed diagrams of driver and current sense circuits in FIG. 3 such as driver circuit 50 and current sense circuit 52, are shown in FIG. 4. Elements included in FIG. 4 are base drive circuitry 60 with data logic input, open-collector transistor 61, and sensing resistor 62 in the emitter to ground circuit. Other elements include resistor 63 connecting driver 50 to transistor 64, transistor 65 serving as a voltage reference element, various voltage supply sources, and an output line 66 directed to Exclusive Or circuit 42 (FIG. 3).

Resistor 62 may be 10 ohms in a typical case and serve to control the output transition of transistor 61 ($dV_0/dt$); it also acts as a current detector when transistor 61 is on. A detectable voltage, for example in the range of 150 millivolts DC is developed across resistor 62. Assuming a reference voltage V REF to transistor 65 in the range of +0.075 volts, outputs via line 66 are approximately:

+5.0 volts when transistor 61 is conducting and
+0.5 volts when transistor 61 is not conducting.

Current flow through transistor 61 when conducting is in the range of 15 milliamps. These outputs can be used to do logical checking versus actual checking for the output driver.

Among advantages of this invention are the following:

1. The circuit overhead to implement the invention becomes minimum as the capabilities of the technologies increase. Today, custom CFET chips of 10,000 equivalent circuits can be easily achieved. Densities higher than 50,000 circuits are predicted in the near future. By including this feature, elements with high failure rates can be detected.

2. By providing this type of self test validation of a bus, service time of systems at customer's offices as well as during manufacturing operations decreases.

3. By dynamically detecting off-chip-driver failure, the level of error detection of a system increases. Therefore the data integrity of the system increases.

4. In a bus which uses three-state drivers, multiple drivers active at the same time may cause component damage to good components. Detection of off-chip-driver failures reduces this problem.

It is also possible to include circuits near the input of the driver circuits to detect specifically which driver is at fault. For example, for Types 1 and 2 which do not drive simultaneously if a particular driver input is inactive but the bus output shows error, another driver must be driving the bus or another driver is in error. If the input is active and output shows no error, the driver circuit is working properly.

The system diagnostics may also determine who the last bus master was when an error occurred and can check for the specific facility causing the error.

While several preferred embodiments of the invention have been illustrated and described, it is to be understood that there is no intention to limit the invention to the precise construction herein disclosed and the right is reserved to all changes and modifications coming within the scope of the invention as defined in the appended claims.

We claim:

1. A self-testing system for driver circuits in a data processing system and the like, said system comprising:
    a plurality of circuit chips;
    a plurality of driver circuits on said circuit chips for developing signals for use externally of said circuit chips;
    interconnection means for interconnecting said circuit chips for communication of said circuit chips with one another; and
    test logic connected in said system to said circuit chips for monitoring signal conditions of said driver circuits, said test logic monitoring input signals of said driver circuits and output signals thereof, said test logic providing an error signal in the event of a disparity between said input and output signals of said driver circuits.

2. A self-testing system for driver circuits in a data processing system and the like, said system comprising:
    a plurality of circuit chips accomodating processors, storage, input/output elements and the like;
    a plurality of driver circuits associated with each of said circuit chips for developing signals for use externally of said circuit chips;
    interconnection means for interconnecting said circuit chips for communication of said circuit chips with one another; and
    test logic connected in said system to said circuit chips for monitoring signal conditions of said driver circuits, said test logic comprising comparison means connected to said driver circuits, said comparison means monitoring input signals to said driver circuits and output signals thereof, said test logic providing an error signal in the event of a disparity between said input and output signals of said driver circuits.

3. A self-testing system for driver circuits in a data processing system and the like, said system comprising:
    a plurality of circuit chips accomodating processor, storage, input/output circuitry, and the like;
    a plurality of driver circuits associated with each of said circuit chips for developing signals for use externally of said circuit chips;
    interconnection means for interconnecting said circuit chips for communication of said circuit chips with one another or with other devices; and test logic connected in said system to said driver circuits for monitoring signal conditions, said test logic comprising a comparison circuit connected to each driver circuit, said comparison circuit monitoring the input signal to the associated driver circuit and the output signal from said driver circuit, said comparison circuit further providing an error signal in the event of a disparity between said input and output signals of said associated driver circuit, common error detection circuitry connected to the output of all of said individual comparison circuits and operable to sense an error signal from any comparison circuit, and latch means incorporated in said detection circuitry for storing any such error indication, said latch means providing an error indication to inform said system of any failure of said driver circuits.

4. A self-testing system for driver circuits for a data processing system and the like, said system comprising:
 a plurality circuit chips including driver circuits for developing signals for use externally of said circuit chips;
 a bus structure;
 interconnection means for interconnecting said circuit chips to said bus structure for communication of said circuit chips with one another; and
 test logic connected in said system to said circuit chips and said bus structure for monitoring signal conditions of said driver circuits, said test logic monitoring the input signals to said driver circuits and output signals thereof supplied to said bus structure, and said test logic providing an error signal in the event of a disparity between said input and output signals of said driver circuits.

5. The system of claim 4 further comprising:
 means for storing an indication of any error signal from said test logic.

6. The system of claim 4 further comprising: common comparison and detection circuitry operable to sense an error signal from any driver circuit, latch means for storing any such error indication, said latch means providing a failure indication to inform said system of any failure of said driver circuits.

7. The self-testing system of claim 4 wherein said driver circuits are of a type that is (1) connected point to point or (2) multiple drivers attached to a single bus line but not simultaneously driving said single bus line.

8. A self-testing system for driver circuits for a data processing system and the like, said system comprising:
 a plurality of circuit chips including driver circuits for developing signals for use externally of said circuit chips;
 a bus structure;
 interconnection means for interconnecting said circuit chips to said bus structure for communication of said circuit chips with one another;
 test logic connected in said system to said circuit chips and said bus structure for monitoring signal conditions of said driver circuits, said test logic monitoring the input signals to said driver circuits and the output signals thereof supplied to said bus structure, and said test logic providing an error signal in the event of a disparity between said input and output signals of said driver circuits; and
 an additional set of test logic monitoring the input signals to said driver circuits including current sensing means interconnected with each of said driver circuits for detecting current flow in said driver circuits and serving as an input to said test logic for comparison against the driver input signals and providing an error signal in the event of a disparity.

9. The self-testing system of claim 8 wherein said driver circuits are of a type that are used when multiple drivers are attached to a single bus line where said drivers do drive said single bus line simultaneously.

* * * * *